US009619939B2

United States Patent
Salter et al.

(10) Patent No.: US 9,619,939 B2
(45) Date of Patent: Apr. 11, 2017

(54) MIXED REALITY GRADUATED INFORMATION DELIVERY

(71) Applicant: Microsoft Technology Licensing, LLC, Redmond, WA (US)

(72) Inventors: Thomas George Salter, Seattle, WA (US); Ben Sugden, Woodinville, WA (US); Daniel Deptford, Redmond, WA (US); Robert Crocco, Jr., Seattle, WA (US); Brian Keane, Bellevue, WA (US); Laura Massey, Redmond, WA (US); Alex Kipman, Redmond, WA (US); Peter Tobias Kinnebrew, Seattle, WA (US); Nicholas Kamuda, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 740 days.

(21) Appl. No.: 13/956,231

(22) Filed: Jul. 31, 2013

(65) Prior Publication Data
US 2015/0035861 A1 Feb. 5, 2015

(51) Int. Cl.
*G06T 19/00* (2011.01)
*G02B 27/01* (2006.01)
(Continued)

(52) U.S. Cl.
CPC .......... *G06T 19/006* (2013.01); *G02B 27/017* (2013.01); *G06F 3/011* (2013.01);
(Continued)

(58) Field of Classification Search
None
See application file for complete search history.

(56) References Cited

U.S. PATENT DOCUMENTS 8,319,772 B2  11/2012  Fong et al.
2009/0289956 A1  11/2009  Douris et al.
(Continued)

FOREIGN PATENT DOCUMENTS

WO  2012076062 A1  6/2012

OTHER PUBLICATIONS

ISA European Patent Office, International Search Report and Written Opinion Issued in Application No. PCT/US2014/048338, Oct. 9, 2014, WIPO, 9 pages.
(Continued)

*Primary Examiner* — James A Thompson
(74) *Attorney, Agent, or Firm* — Alleman Hall McCoy Russell & Tuttle LLP (57) ABSTRACT

Embodiments that relate to presenting a plurality of visual information density levels for a plurality of geo-located data items in a mixed reality environment are disclosed. For example, in one disclosed embodiment a graduated information delivery program receives information for a selected geo-located data item and provides a minimum visual information density level for the item to a head-mounted display device. The program receives via the head-mounted display device a user input corresponding to the selected geo-located data item. Based on the input, the program provides an increasing visual information density level for the selected item to the head-mounted display device for display within the mixed reality environment.

18 Claims, 8 Drawing Sheets

(51) Int. Cl.
*G06F 3/01* (2006.01)
*G06F 3/0481* (2013.01)
*G06F 3/0346* (2013.01)
*G02B 27/00* (2006.01)

(52) U.S. Cl.
CPC .. *G02B 27/0093* (2013.01); *G02B 2027/0178* (2013.01); *G06F 3/0346* (2013.01); *G06F 3/04815* (2013.01)

(56) References Cited

U.S. PATENT DOCUMENTS

| | | |
|---|---|---|
| 2010/0328344 A1 | 12/2010 | Mattila et al. |
| 2011/0221771 A1* | 9/2011 | Cramer et al. ............... 345/633 |
| 2012/0075433 A1* | 3/2012 | Tatzgern et al. ............... 348/50 |
| 2012/0221241 A1 | 8/2012 | Nurmi |
| 2012/0299920 A1 | 11/2012 | Coombe et al. |
| 2012/0310964 A1 | 12/2012 | Boschker et al. |
| 2013/0006529 A1* | 1/2013 | Miyamoto ............ G01C 21/365 701/516 |
| 2013/0162632 A1 | 6/2013 | Varga et al. |
| 2014/0225917 A1* | 8/2014 | Ellenby et al. ............... 345/633 |

OTHER PUBLICATIONS

IPEA European Patent Office, Second Written Opinion Issued in Application No. PCT/US2014/048338, Jul. 1, 2015, WIPO, 5 Pages.

Bayoetech., "Nokia City Lens for Windows Phone", Retrieved at <<http://www.bayoetech.web.id/Mobile-Phone-Tech-2012/nokia-city-lens-comes-out-of-beta#.UXe7NrWcWBJ>>, Sep. 12, 2012, pp. 11.

"Augmented Reality", Retrieved at <<http://unam.mobi/en/news/augmented-reality>>, Retrieved date: Apr. 23, 2013, p. 1.

IPEA European Patent Office, International Preliminary Report on Patentability Issued in Application No. PCT/US2014/048338, Sep. 16, 2015, WIPO, 6 Pages.

* cited by examiner

FIG. 8B a
MIXED REALITY GRADUATED INFORMATION DELIVERY

BACKGROUND

Mixed reality devices such as head-mounted display devices may be used in a variety of real-world environments and contexts. Such devices may provide a user with a real-time view of the physical environment surrounding the user, and may augment the view with virtual reality information, such as holographic images, text, and/or other visual information.

Some virtual reality information may be geo-located at a particular location in the physical environment. In some contexts, large amounts of geo-located virtual reality information may be available for presentation to a user. With so much virtual reality information available, managing the presentation of this information to a user can prove challenging. Presenting too much virtual reality information may clutter a user's experience of a mixed reality environment and overwhelm the user, making the information difficult to process.

In situations where a user's awareness of the immediate physical environment is desirable, such as in a busy urban setting, such virtual information clutter may also pose a safety hazard. Additionally, in some cases the user may be interested in viewing a limited portion of the total amount of geo-located virtual reality information available. In other cases, the user may desire to view more detailed information regarding one or more items of geo-located information. Further, even when a smaller portion of the available virtual reality information is presented, the amount of information and manner of presentation may still create a user experience that is less than desirable.

SUMMARY

Various embodiments are disclosed herein that relate to presenting a plurality of visual information density levels for a plurality of geo-located data items. For example, one disclosed embodiment provides, in a head-mounted display device, a method for presenting a plurality of visual information density levels for a plurality of geo-located data items in a mixed reality environment. The visual information density levels may comprise a minimum visual information density level and a plurality of increasing visual information density levels. The method includes receiving information for a selected geo-located data item. The minimum visual information density level for the selected geo-located data item is provided to a display system for display by the head-mounted display device within the mixed reality environment.

A user input corresponding to the selected geo-located data item is received. Based on the user input, one of the increasing visual information density levels for the selected geo-located data item is provided to the display system for display by the head-mounted display device within the mixed reality environment.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
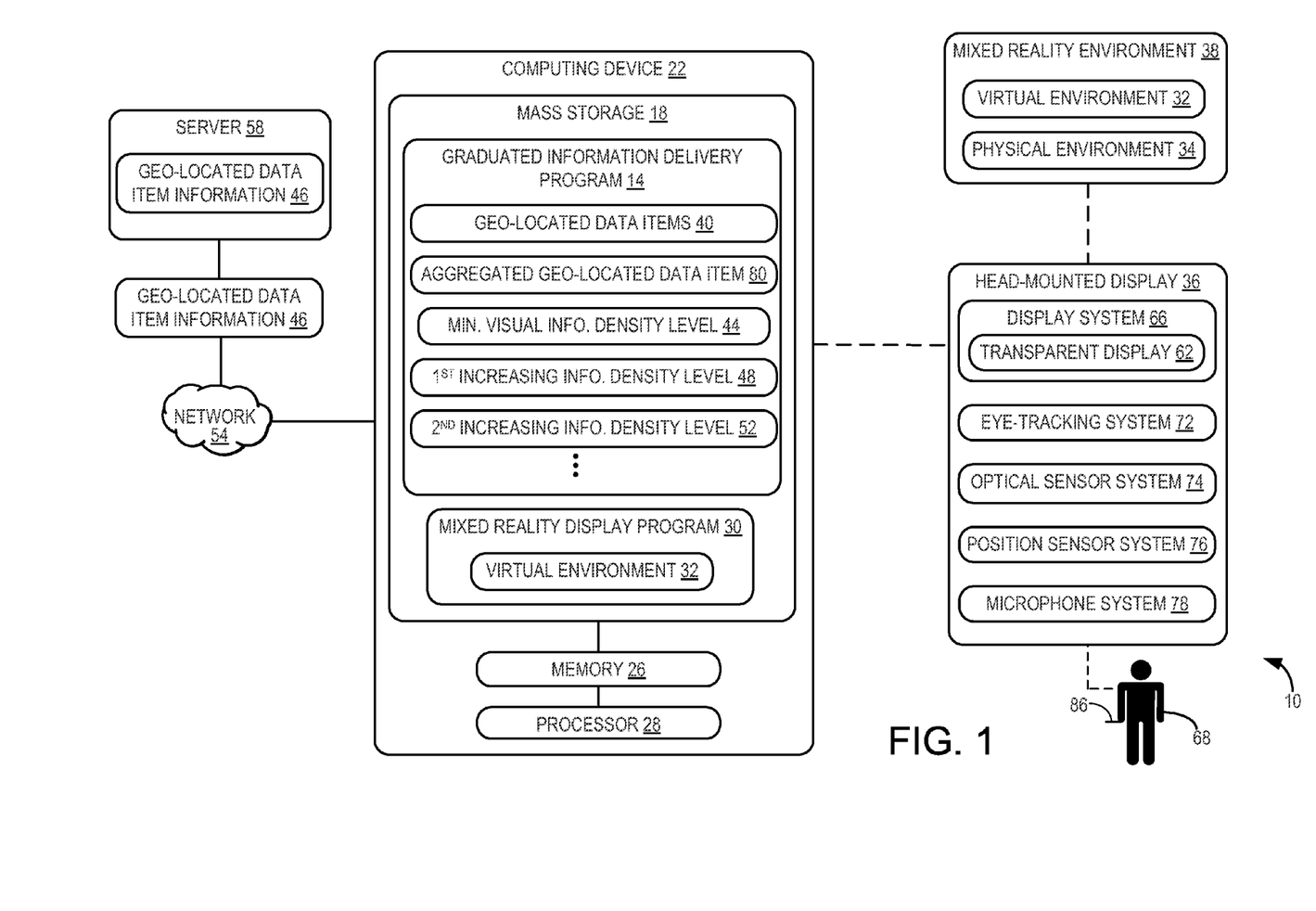
FIG. 1 is a schematic view of a mixed reality system according to an embodiment of the present disclosure.

FIG. 1 shows a schematic view of one embodiment of a mixed reality system 10. The mixed reality system 10 includes a graduated information delivery program 14 that may be stored in mass storage 18 of a computing device 22. The graduated information delivery program 14 may be loaded into memory 26 and executed by a processor 28 of the computing device 22 to perform one or more of the methods and processes described in more detail below.

The mixed reality system 10 includes a mixed reality display program 30 that may generate a virtual environment 32 for display within a physical environment 34 as viewed via a display device, such as a head-mounted display (HMD) device 36, to create a mixed reality environment 38. As described in more detail below, the virtual environment 32 may include geo-located data items 40 presented in one or more visual information density levels. As further described below, such geo-located data items 40 may include, but are not limited to, social networking data, image data, recommendation/review data, and entity description data. The geo-located data items 40 may be presented in the one or more visual information density levels via images, graphics, and/or text, such as geo-located, two-dimensional or three-dimensional images, graphics, and/or text.

The visual information density levels may include a minimum visual information density level 44 and a plurality of increasing visual information density levels, such as a first increasing visual information density level 48 and a second increasing visual information density level 52. It will be appreciated that any suitable number of increasing visual information density levels may be provided. In one example and as described in more detail below, each increasing visual information density level sequentially provides a greater amount of information related to a particular geo-located data item 40 than provided in the previous information density level.

In some examples, each such greater amount of information includes all of the information contained in the related previous information density level along with additional information related to the particular geo-located data item 40. In other examples, each such greater amount of information includes none or a portion of the information contained in the related previous information density level along with additional information related to the particular geo-located data item 40.

In one example, and as described in more detail below, geo-located data item information 46 may be received by the computing device 22 via a network 54 from a server 58 or other external source. The geo-located data item information 46 may include a plurality of visual information density levels for one or more geo-located data items 40. In other examples, the graduated information delivery program 14 may segregate the geo-located data item information 46 into a plurality of visual information density levels. In still other examples, geo-located data item information 46 may be generated locally on the computing device 22.

The computing device 22 may take the form of a desktop computing device, a mobile computing device such as a smart phone, laptop, notebook or tablet computer, network computer, home entertainment computer, interactive television, gaming system, or other suitable type of computing device. Additional details regarding the components and computing aspects of the computing device 22 are described in more detail below with reference to FIG. 9.

The computing device 22 may be operatively connected with the HMD device 36 using a wired connection, or may employ a wireless connection via WiFi, Bluetooth, or any other suitable wireless communication protocol. Additionally, the example illustrated in FIG. 1 shows the computing device 22 as a separate component from the HMD device 36. It will be appreciated that in other examples the computing device 22 may be integrated into the HMD device 36.

Figure 2:
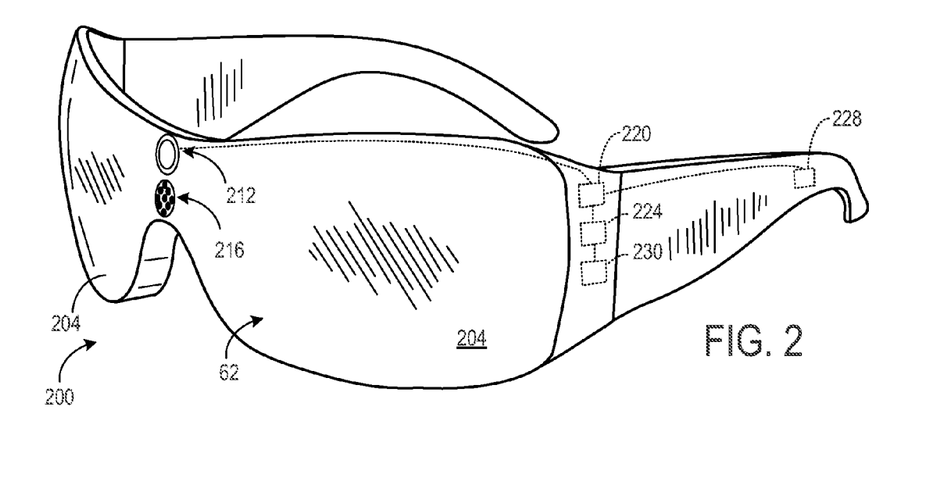
FIG. 2 shows an example head-mounted display device according to an embodiment of the present disclosure.

With reference now also to FIG. 2, one example of an HMD device 200 in the form of a pair of wearable glasses with a transparent display 62 is provided. It will be appreciated that in other examples, the HMD device 200 may take other suitable forms in which a transparent, semi-transparent or non-transparent display is supported in front of a viewer's eye or eyes. It will also be appreciated that the HMD device 36 shown in FIG. 1 may take the form of the HMD device 200, as described in more detail below, or any other suitable HMD device. Additionally, many other types and configurations of display devices having various form factors may also be used within the scope of the present disclosure. Such display devices may include, but are not limited to, handheld smart phones, tablet computers, and other suitable display devices.

With reference to FIGS. 1 and 2, in this example the HMD device 36 includes a display system 66 and transparent display 62 that enables geo-located data items 40 in various visual information density levels to be delivered to the eyes of a user 68. The transparent display 62 may be configured to visually augment an appearance of a physical environment 34 to a user 68 viewing the physical environment through the transparent display. For example, the appearance of the physical environment may be augmented by graphical content (e.g., one or more pixels each having a respective color and brightness) that is presented via the transparent display 62 to create a mixed reality environment 38.

The transparent display 62 may also be configured to enable a user to view a physical, real-world object in the physical environment through one or more partially transparent pixels that are displaying a virtual object representation. In one example, the transparent display 62 may include image-producing elements located within lenses 204 (such as, for example, a see-through Organic Light-Emitting Diode (OLED) display). As another example, the transparent display 62 may include a light modulator on an edge of the lenses 204. In this example the lenses 204 may serve as a light guide for delivering light from the light modulator to the eyes of a user. Such a light guide may enable a user to perceive a 2D image or a 3D holographic image located within the physical environment that the user is viewing, while also allowing the user to view physical objects in the physical environment.

The HMD device 36 may also include various sensors and related systems. For example, the HMD device 36 may include an eye-tracking sensor system 72 that utilizes at least one inward facing sensor 216. The inward facing sensor 216 may be an image sensor that is configured to acquire image data in the form of eye-tracking information from a user's eyes. Provided the user has consented to the acquisition and use of this information, the eye-tracking sensor system 72 may use this information to track a position and/or movement of the user's eyes.

The HMD device 36 may also include sensor systems that receive physical environment data from the physical environment 34. For example, the HMD device 36 may include an optical sensor system 74 that utilizes at least one outward facing sensor 212, such as an optical sensor. Outward facing sensor 212 may detect movements within its field of view, such as gesture-based inputs or other movements performed by a user 68 or by a person or physical object within the user's field of view. Outward facing sensor 212 may also capture two-dimensional image information and depth information from physical environment 34 and physical objects within the environment. For example, outward facing sensor 212 may include a depth camera, a visible light camera, an infrared light camera, and/or a position tracking camera.

The HMD device 36 may include depth sensing via one or more depth cameras. In one example, each depth camera may include left and right cameras of a stereoscopic vision system. Time-resolved images from one or more of these depth cameras may be registered to each other and/or to images from another optical sensor such as a visible spectrum camera, and may be combined to yield depth-resolved video.

In other examples a structured light depth camera may be configured to project a structured infrared illumination, and to image the illumination reflected from a scene onto which the illumination is projected. A depth map of the scene may be constructed based on spacings between adjacent features in the various regions of an imaged scene. In still other examples, a depth camera may take the form of a time-of-flight depth camera configured to project a pulsed infrared illumination onto a scene and detect the illumination reflected from the scene. It will be appreciated that any other suitable depth camera may be used within the scope of the present disclosure.

Outward facing sensor 212 may capture images of the physical environment in which a user 68 is situated. In one example, the mixed reality display program 30 may include a 3D modeling system that uses such input to generate the virtual environment 32 that may model the physical environment 34 surrounding the user.

The HMD device 36 may also include a position sensor system 76 that utilizes one or more motion sensors 220 to enable position tracking and/or orientation sensing of the HMD device. For example, the position sensor system 76 may be utilized to determine a head pose orientation of a user's head. In one example, position sensor system 76 may comprise an inertial measurement unit configured as a six-axis or six-degree of freedom position sensor system. This example position sensor system may, for example, include three accelerometers and three gyroscopes to indicate or measure a change in location of the HMD device 36 within three-dimensional space along three orthogonal axes (e.g., x, y, z), and a change in an orientation of the HMD device about the three orthogonal axes (e.g., roll, pitch, yaw).

Position sensor system 76 may also support other suitable positioning techniques, such as GPS or other global navigation systems. Further, while specific examples of position sensor systems have been described, it will be appreciated that other suitable position sensor systems may be used.

In some examples, motion sensors 220 may also be employed as user input devices, such that a user may interact with the HMD device 36 via gestures of the neck and head, or even of the body. The HMD device 36 may also include a microphone system 78 that includes one or more microphones 224. In other examples, audio may be presented to the user via one or more speakers 228 on the HMD device 36.

The HMD device 36 may also include a processor 230 having a logic subsystem and a storage subsystem, as discussed in more detail below with respect to FIG. 9, that are in communication with the various sensors and systems of the HMD device. In one example, the storage subsystem may include instructions that are executable by the logic subsystem to receive signal inputs from the sensors and forward such inputs to computing device 22 (in unprocessed or processed form), and to present images to a user via the transparent display 62.

It will be appreciated that the HMD device 36 and related sensors and other components described above and illustrated in FIGS. 1 and 2 are provided by way of example. These examples are not intended to be limiting in any manner, as any other suitable sensors, components, and/or combination of sensors and components may be utilized. Therefore it is to be understood that the HMD device 36 may include additional and/or alternative sensors, cameras, microphones, input devices, output devices, etc. without departing from the scope of this disclosure. Further, the physical configuration of the HMD device 36 and its various sensors and subcomponents may take a variety of different forms without departing from the scope of this disclosure.

Figure 3:
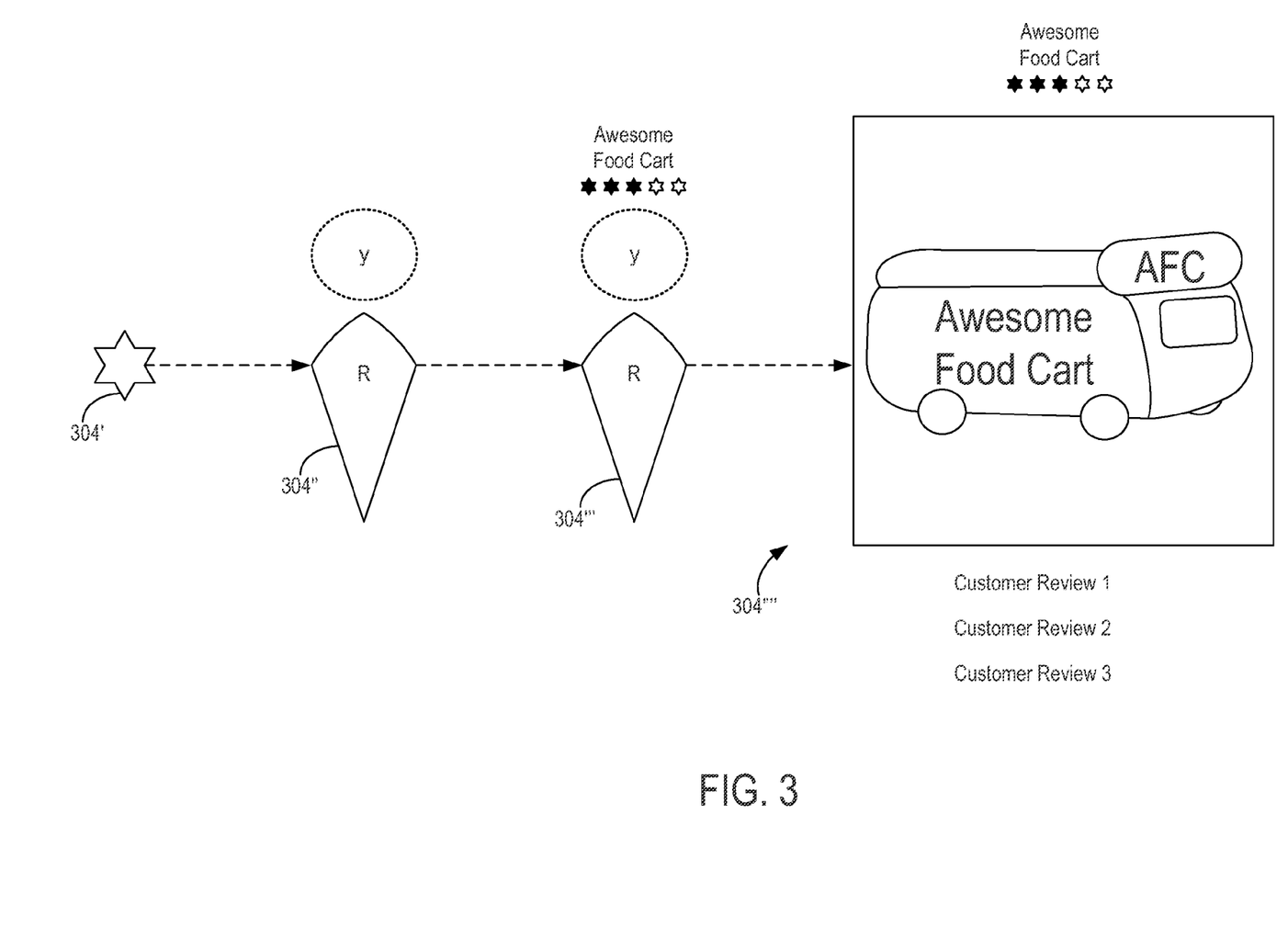
FIG. 3 is a schematic illustration of a minimum visual information density level and a plurality of increasing visual information density levels and corresponding indicators for a geo-located data item.

With reference now to FIGS. 3-7, descriptions of example use cases and embodiments of the mixed reality system 10 will now be provided. Turning to FIG. 3 and as described in more detail below, the graduated information delivery program 14 may present a geo-located data item 40 in one or more visual information density levels. In the example shown in FIG. 3, the geo-located data item is a recommendation/review data item. The recommendation/review data item may correspond to data from a recommendation/review service that provides recommendations and/or reviews for products, services, and the like. In other examples, the recommendation/review data item may correspond to recommendation and/or review data received from other sources, such as social networking services.

In the example shown in FIG. 3, the recommendation/review data item is visually represented in a plurality of increasing visual information density levels and corresponding indicator images. As described in more detail below, a user 68 may advance from a current visual information density level for a selected geo-located data item 40 to a next, increasing visual information density level via user input corresponding to the selected geo-located data item. In one example, a minimum visual information density level of the recommendation/review data item may be represented by an indicator, such as a star 304'. It will be appreciated that any suitable form or shape of indicator or other visual representation may be utilized. As described in more detail below, an indicator corresponding to the minimum visual information density level may simply convey to a user that a geo-located data item 40 is located at the location in the physical environment 34 at which the indicator is displayed to the user via the HMD device 36.

Upon receiving user input directed to the star 304' corresponding to the minimum visual information density level, a first increasing visual information density level of the recommendation/review data item may be displayed. As shown in FIG. 3, the first increasing visual information density level of the recommendation/review data item may be represented by a different indicator 304" that provides more information about the geo-located data item 40 than the minimum visual information density level indicator 304'. In the example shown in FIG. 3, the indicator 304" corresponding to the first increasing visual information density level may include an "R" to convey to a user that the geo-located data item is a recommendation/review data item. In this example, the first increasing visual information density level indicator 304" may also include a designator "y" that corresponds to a particular recommendation/review service that is providing the information.

Upon receiving user input directed to the first increasing visual information density level indicator 304", a second increasing visual information density level of the recommendation/review data item may be displayed. The second increasing visual information density level of the recommendation/review data item may be represented by an indicator 304'" that is the same as the first information density level indicator 304", and also includes more information about the data item than the first information density level indicator 304". In the example shown in FIG. 3, the second increasing visual information density level indicator 304'" includes the name of the service receiving the recommendation/review information along with a rating, such as 3 out of 5 stars.

Upon receiving user input directed to the second increasing visual information density level indicator 304'", a third increasing visual information density level indicator 304"" corresponding to the recommendation/review data item may be displayed. The third increasing visual information density level indicator 304"" of the recommendation/review data item provides more information about the geo-located data item 40 than the second information density level indicator 304'". In the example shown in FIG. 3, the third increasing visual information density level indicator 304"" includes an image of the Awesome Food Cart along with 3 customer review hyperlinks that correspond to full text customer reviews of the food cart.

As shown in the example of FIG. 3, the increasing visual information density levels may occupy increasing amounts of visual space within a mixed reality environment. Advantageously and as described in more detail below, by utilizing such increasing visual information density levels, the mixed reality system 10 may initially present a lower information density level and correspondingly smaller indicator for a plurality of geo-located data items 40 to avoid presenting excess information and potentially obstructing the user's view of the physical environment. Upon receiving user input selecting one or more of the geo-located data items 40, the mixed reality system 10 may provide an increasing visual information density level and correspondingly modified indicator and/or additional visual information for the selected geo-located data items 40.

Figure 4:
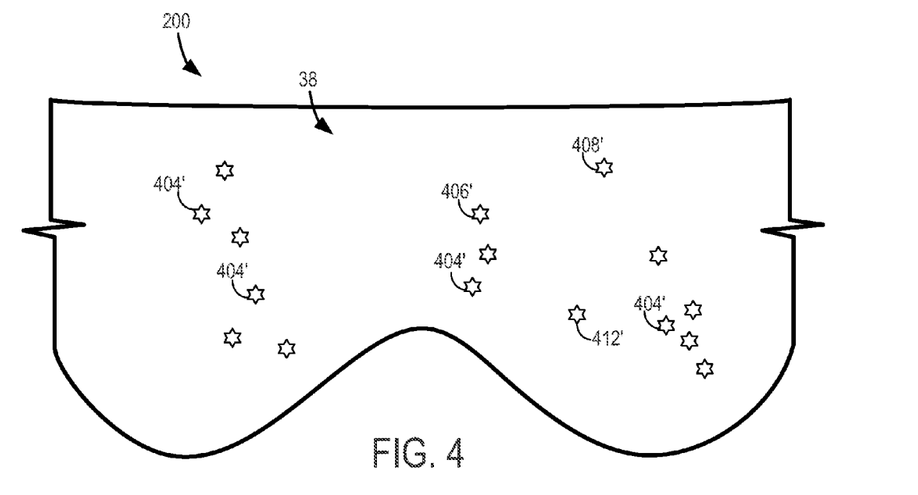
FIG. 4 is a schematic view of a plurality of minimum visual information density level indicators corresponding to geo-located data items as seen through a head-mounted display device.
Figure 5:
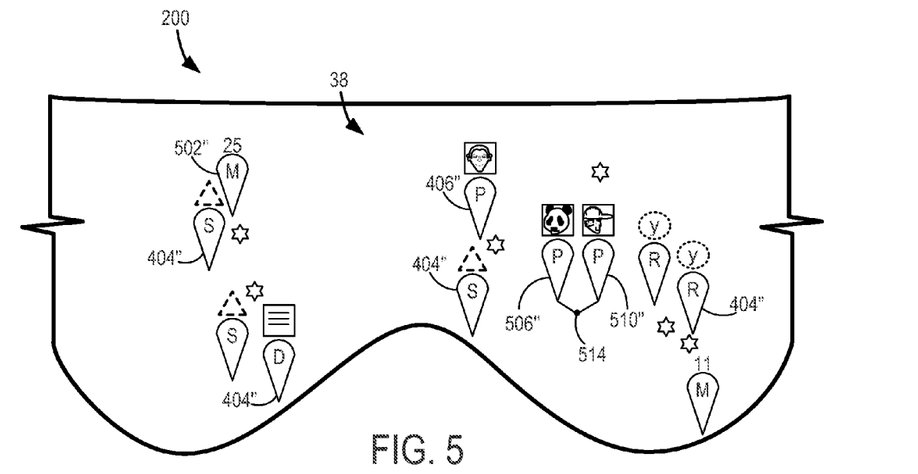
FIG. 5 is a schematic view of FIG. 4 in which some of the minimum visual information density level indicators are expanded to an increasing visual information density level indicator.

With reference now to FIGS. 4 and 5, example schematic views of indicators of visual information density levels displayed within a physical environment as seen through an HMD device 200 are provided. As shown in FIG. 4, in one example a plurality of indicators 404', 406', and 408' corresponding to minimum visual information density levels are displayed. Each of the indicators 404', 406', and 408' may correspond to one of a plurality of types of geo-located data items 40.

As shown in FIG. 4, indicators 404', 406' and 408' corresponding to minimum visual information density levels occupy a relatively small amount of visual space within the mixed reality environment 38 as viewed through the HMD device 200. Advantageously, in this manner the mixed reality system 10 may generally indicate to a user the location of geo-located data items 40 that are within the current field of view of the user.

Where a user desires more information regarding a particular geo-located data item 40 represented by one of the indictors, the user may provide user input corresponding to the indicator and corresponding selected geo-located data item via the HMD device 36. In one example, the user may gaze at indicator 406' corresponding to a minimum visual information density level for a predetermined period of time. Such predetermined period of time may be, for example, 1 second, 2 seconds, 3 seconds, or any suitable period of time. With reference now to FIG. 5, using data from the eye-tracking sensor system 72 and upon expiration of the predetermined period of time, the graduated information delivery program 14 may replace the minimum visual information density level indicator 406' with an increasing visual information density level indicator 406" comprising additional information related to the corresponding geo-located data item 40. In this example and as described in more detail below, the geo-located data item is an image geo-located data item.

In other examples of user input, the user may provide gesture data in the form of hand, arm, body, head, or other user movement that indicates a geo-located data item. In other examples, user input in the form of head pose data comprising head orientation, position and/or location may be used to indicate a geo-located data item. In other examples, user input in the form of voice data may be used to indicate a geo-located data item. For example, a user may verbally identify a particular indicator corresponding to a geo-located data item. In other examples and with reference again to FIG. 1, hand-held indicator data may be received from a hand-held indicator 86 that may be operated by the user 68 to indicate a geo-located data item. For example, the position of the hand-held indicator 86 may be used by the HMD device 200 to display a pointing element within the mixed reality environment 38 that the user may guide to an indicator corresponding to a geo-located data item. The user 68 may then select the indictor using the hand-held indicator 86 or other form of user input.

As shown in FIG. 5, increasing visual information density levels and corresponding indicators 404" corresponding to a variety of different geo-located data items 40 may be provided. For example, a recommendation/review geo-located data item may be represented by an indicator that includes the letter "R." An image geo-located data item may be represented by an indicator that includes the letter "P" and a thumbnail of the image above the indicator. An image geo-located data item may correspond to photo, hologram, video and/or other image data from one or more sources.

A social networking geo-located data item may be represented by an indicator that includes the letter "S" and an icon representing the particular social networking service above the indicator. A social networking geo-located data item may correspond to data from a social networking service such as, for example, posts, alerts, messages, photos, etc. An entity description geo-located data item may be represented by an indicator that includes the letter "D." An entity description geo-located data item may correspond to data related to a person, character, company, service, location, and/or any other entity. Entity description data may include, for example, wiki entries, blog postings, advertisements, etc. It will also be appreciated that any suitable number and/or type of geo-located data items may be utilized and are within the scope of the present disclosure. It will also be appreciated that the particular forms and examples of indicators provided herein are for descriptive purposes, and that any other suitable form, shape, type, of size of indicator may be utilized and are within the scope of the present disclosure.

In one example, 2 or more geo-located data items 40 may be located at the same location or at locations very close to one another in the mixed reality environment 38. In this example, the 2 or more geo-located data items may be located at locations close enough to one another that displaying a visual information density level indicator for each of the 2 or more geo-located data items would cause the corresponding indicators to appear crowded to a user and/or to partially or completely overlap.

For example, the graduated information delivery program 14 may determine that, as displayed via the HMD device 200, the 2 or more geo-located data items would be separated by a predetermined distance or less. Such predetermined distance may be, for example, 0.5 millimeters (mm), 1 mm, or any other suitable predetermined distance. The predetermined distance may be measured, for example, with respect to the transparent display 62 of the HMD device 200.

Based on the separation of the geo-located data items being the predetermined distance or less, the graduated information delivery program 14 may collapse the 2 or more geo-located data items into a single, aggregated geo-located data item 80. As shown in FIG. 4, the aggregated geo-located data item 80 may be displayed as a minimum visual information density level indicator 408' located at a location at or near to the location(s) of the 2 or more geo-located data items.

In another example and with reference again to FIG. 4, an aggregated geo-located data item 80 may be indicated by a minimum visual information density level indicator 412', and may correspond to 2 image data geo-located data items. A user 68 may point at the indicator 412' corresponding to the aggregated geo-located data item 80, which gesture is received via the optical sensor system 74 of the HMD device 200.

Based on the user's gesture directed to the indicator 412', the graduated information delivery program 14 may expand the aggregated geo-located data item 80 to provide an increasing visual information density level for each of the two image data geo-located data items. With reference now to FIG. 5, in one example the two image data geo-located data items may be represented by indicators 506" and 510" corresponding to increasing visual information density levels. In one example, each such indicator 506" and 510" may be linked to a location indicator 514 representing an approximate location of the geo-located data item corresponding to each such indicator.

In other examples, 2 or more geo-located data items 40 located at the same location or at locations very close to one another may be represented by a single increasing visual information density level indicator that indicates the number of geo-located data items at or close to the location. For example and as shown in FIG. 5, an indicator 502" may represent 25 different geo-located data items located at or close to a given location. In this example, the indicator includes the letter "M" to indicate that multiple geo-located data items are represented, along with the number 25 indicating 25 such data items.

Figure 6:
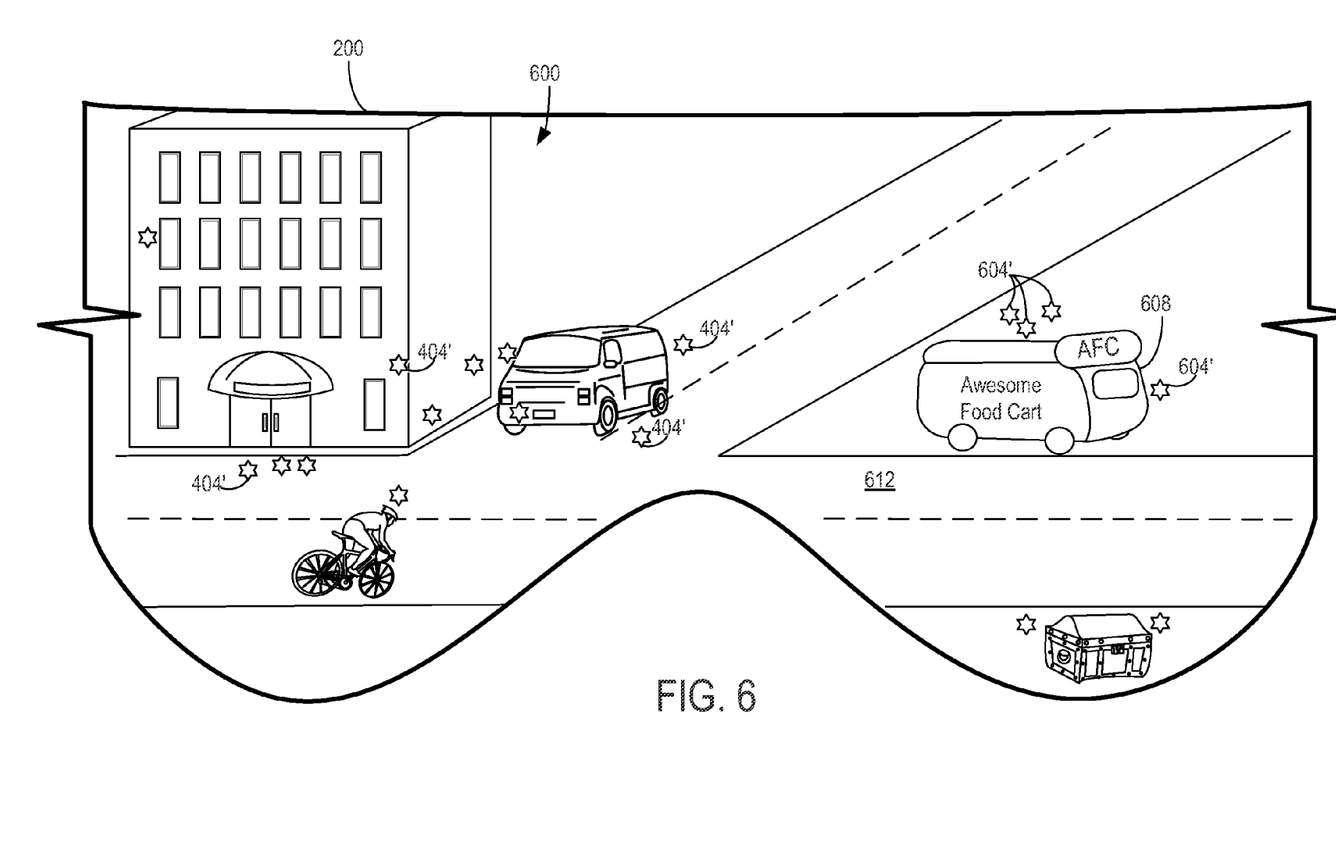
FIG. 6 is a schematic view of a mixed reality environment including a physical environment and a plurality of minimum visual information density level indicators as viewed via a head-mounted display device.

With reference now to FIG. 6, in one example a user may be located near a city intersection including street 612 and may view a mixed reality environment 600 that includes the intersection via the HMD device 200. The mixed reality environment 600 may also include a plurality of indicators 404' and 604' corresponding to a minimum visual information density level of one or more geo-located data items 40. The minimum visual information density level indicators 604' are each located near the Awesome Food Cart 608.

Figure 7:
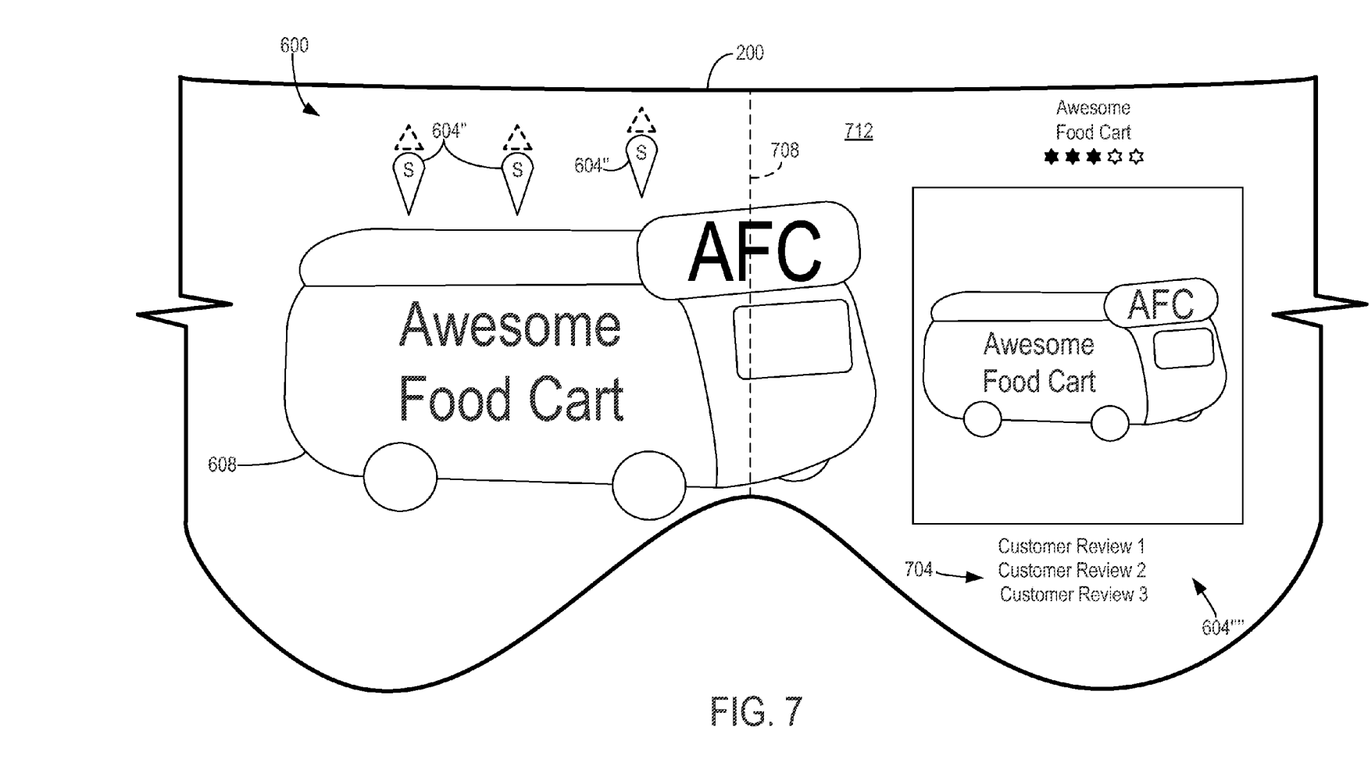
FIG. 7 is a schematic view of a portion of the mixed reality environment of FIG. 6 as viewed via the head-mounted display device from a location different from FIG. 6.

The position sensor system 76 of the HMD device 200 may determine location data corresponding to the location of the HMD device 200. With reference now also to FIG. 7, a user wearing the HMD device 200 may walk across the street 612 and toward the Awesome Food Cart 608. Using the location data of the HMD device 200, the graduated information delivery program 14 may determine that the HMD device 200 is moving closer to a location of the minimum visual information density level indicators 604', and corresponding geo-located data items 40, near the Awesome Food Cart 608. Based on the HMD device 200 moving closer to the minimum visual information density level indicators 604' and corresponding geo-located data items 40, the graduated information delivery program 14 may provide one or more increasing visual information density levels for the corresponding geo-located data items 40.

In the example shown in FIG. 7, the 3 corresponding geo-located data items 40 located above the Awesome Food Cart 608 may be represented by first increasing visual information density level indicators 604". In this example, the first increasing visual information density level indicators 604" correspond to social networking geo-located data items.

In one example, the user and HMD device 200 may be closer to the geo-located data item 40 located to the right of the Awesome Food Cart 608 as compared to the geo-located data items 40 located above the Awesome Food Cart 608. Accordingly, in this example the geo-located data item 40 located to the right of the Awesome Food Cart 608 may be represented by third increasing visual information density level indicator 604"". As shown in FIG. 7, the third increasing visual information density level indicator 604"" corresponds to a recommendation/review geo-located data item. In this example, the third increasing visual information density level indicator 604"" includes a 3 out of 5 star rating, a photograph of the Awesome Food Cart 608, and hyperlinks 704 to 3 customer reviews of the Awesome Food Cart.

In some examples, the graduated information delivery program 14 may programmatically provide one or more increasing visual information density levels for a geo-located data item based on the HMD device 200 moving closer to a visual information density level indicator corresponding to the geo-located data item, and without any corresponding user input.

In another example, when a spatial information density in a mixed reality environment is below a predetermined threshold, instead of providing a minimum visual information density level for a geo-located data item, the graduated information delivery program 14 may provide one of the increasing visual information density levels for the geo-located data item. With reference again to FIG. 7, in one example a user may be viewing the Awesome Food Cart 608 via the HMD device 200. A spatial information density may be defined as a percentage of a unit area of the transparent display 62 of the HMD device 200 that is occupied by displayed geo-located data item information. A unit area may be, for example, a defined region of the transparent display 62, and may be defined by a particular area, such as 25 square millimeters ($mm^2$), 50 $mm^2$, 100 $mm^2$, or any other suitable unit area. A predetermined threshold of the spatial information density may be, for example, 10%, 25%, 50%, 75%, or any other suitable percentage of the unit area. In some examples multiple different unit areas and corresponding predetermined threshold percentages may be utilized.

With reference again to FIG. 7, in this example the geo-located data item 40 located to the right of the Awesome Food Cart 608 may be the sole geo-located data item located to the right of line 708 that bisects the transparent display 62 of the HMD device 200. Displaying the third increasing visual information density level indicator 604"" may occupy 49% of the right half 712 of the transparent display 62. Where a predetermined threshold of spatial information density is 50% of one half of the transparent display 62, the graduated information delivery program 14 may programmatically display the third increasing visual information density level indicator 604"" without any user input directed to the corresponding geo-located data item 40.

Figure 8A:
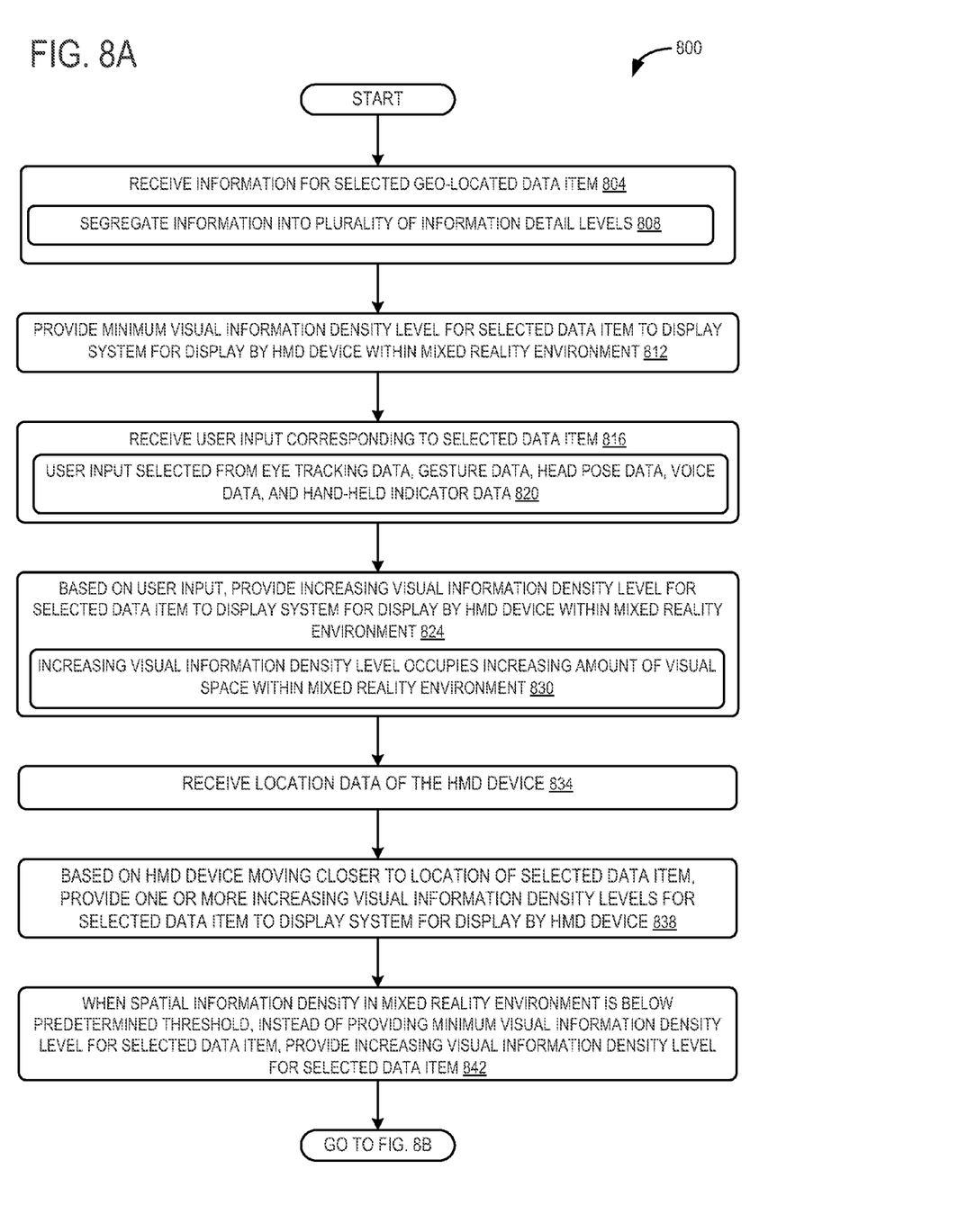
FIGS. 8A and 8B are a flow chart of a method for presenting a plurality of visual information density levels for a plurality of geo-located data items according to an embodiment of the present disclosure.
Figure 8B:
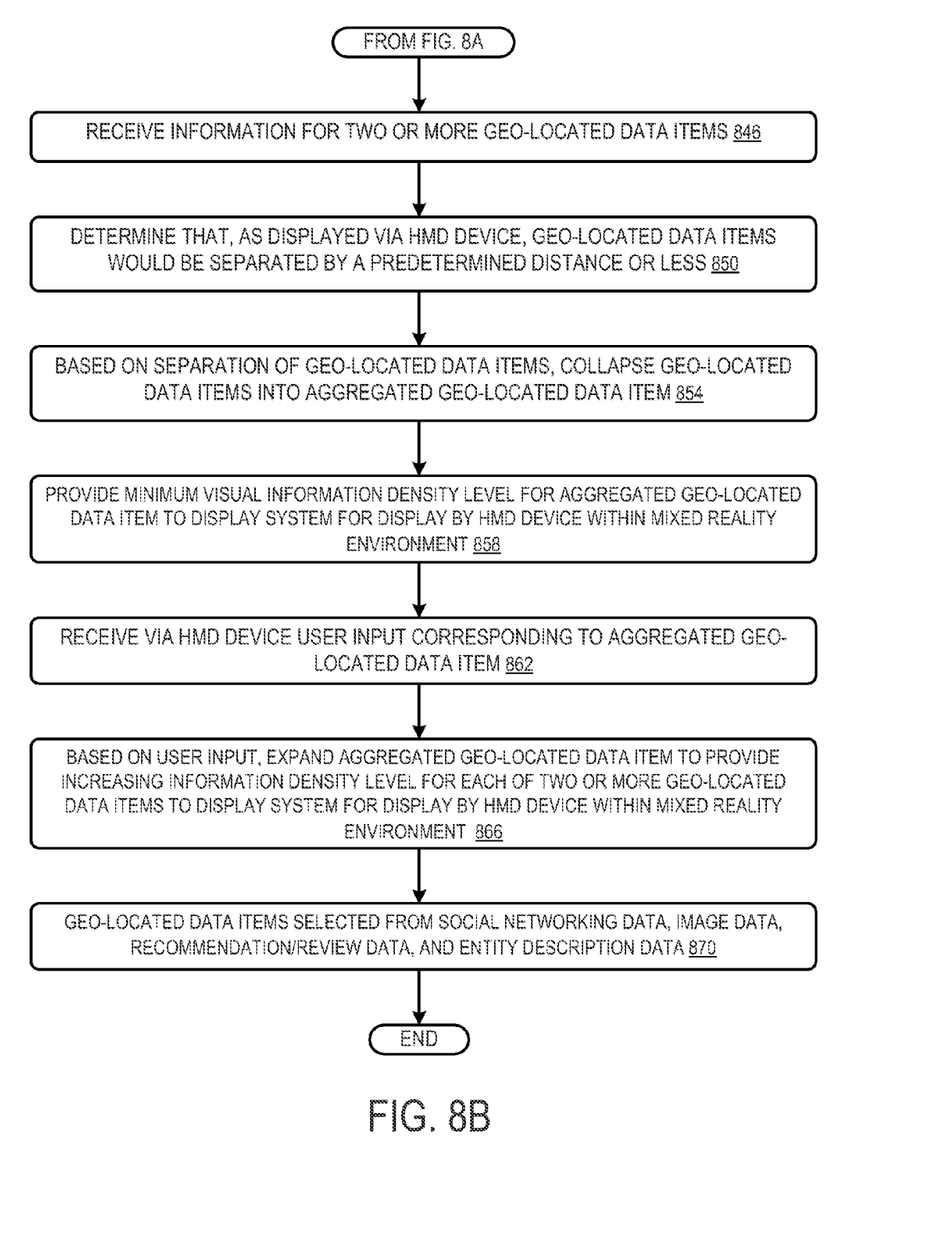

FIGS. 8A and 8B illustrate a flow chart of a method 800 for presenting a plurality of visual information density levels for a plurality of geo-located data items in a mixed reality environment according to an embodiment of the present disclosure. The following description of method 800 is provided with reference to the software and hardware components of the mixed reality system 10 described above and shown in FIGS. 1-7. It will be appreciated that method 800 may also be performed in other contexts using other suitable hardware and software components.

With reference to FIG. 8A, at 804 the method 800 may include receiving information for a selected geo-located data item. At 808 the method 800 may include segregating the information into the plurality of information detail levels. At 812 the method 800 may include providing a minimum visual information density level for the selected geo-located data item to a display system for display by a head-mounted display device within the mixed reality environment.

At 816 the method 800 may include receiving a user input corresponding to the selected geo-located data item. At 820 the user input may be selected from a group consisting of eye tracking data, gesture data, head pose data, voice data, and hand-held indicator data. At 824 and based on the user input, the method 800 may include providing an increasing visual information density level for the selected geo-located data item to the display system for display by the head-mounted display device within the mixed reality environment. At 830 the increasing visual information density level may occupy an increasing amount of visual space within the mixed reality environment.

At 834 the method 800 may include receiving location data of the head-mounted display device. At 838 and based on the head-mounted display device moving closer to a location of the selected geo-located data item, the method 800 may include providing one or more of the increasing visual information density levels for the selected geo-located data item to the display system for display by the head-mounted display device. At 842 the method 800 may include, when a spatial information density in the mixed reality environment is below a predetermined threshold, instead of providing the minimum visual information density level for the selected geo-located data item, providing one of the increasing visual information density levels for the selected geo-located data item.

With reference now to FIG. 8B, at 846 the method 800 may include receiving information for two or more geo-located data items. At 850 the method 800 may include determining that, as displayed via the head-mounted display device, the geo-located data items would be separated by a predetermined distance or less. At 854 and based on the separation of the geo-located data items, the method 800 may include collapsing the geo-located data items into an aggregated geo-located data item. At 858 the method 800 may include providing the minimum visual information density level for the aggregated geo-located data item to the display system for display by the head-mounted display device within the mixed reality environment.

At 862 the method 800 may include receiving via the head-mounted display device a user input corresponding to the aggregated geo-located data item. At 866 and based on the user input, the method 800 may include expanding the aggregated geo-located data item to provide an increasing visual information density level for each of the two or more geo-located data items to the display system for display by the head-mounted display device within the mixed reality environment. At 870 the geo-located data items may be selected from a group consisting of social networking data, image data, recommendation/review data, and entity description data.

It will be appreciated that method 800 is provided by way of example and is not meant to be limiting. Therefore, it is to be understood that method 800 may include additional and/or alternative steps than those illustrated in FIGS. 8A and 8B. Further, it is to be understood that method 800 may be performed in any suitable order. Further still, it is to be understood that one or more steps may be omitted from method 800 without departing from the scope of this disclosure.

Figure 9:
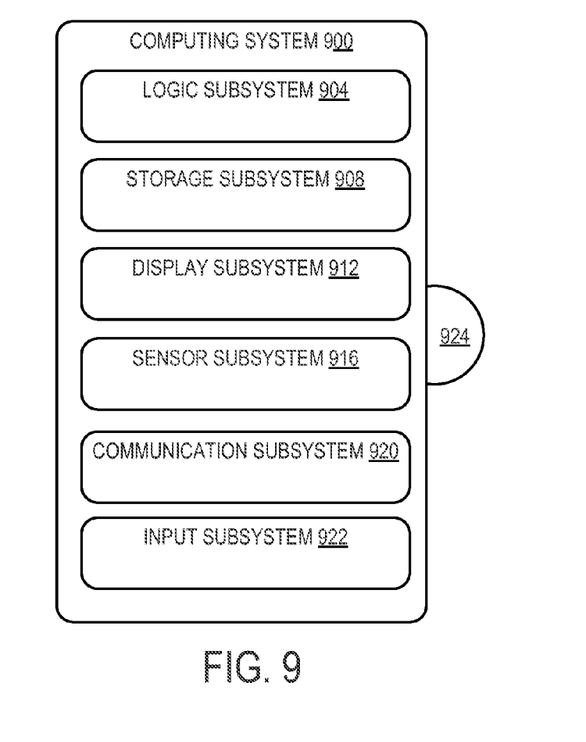
FIG. 9 is a simplified schematic illustration of an embodiment of a computing device.

FIG. 9 schematically shows a nonlimiting embodiment of a computing system 900 that may perform one or more of the above described methods and processes. Computing device 22 may take the form of computing system 900. Computing system 900 is shown in simplified form. It is to be understood that virtually any computer architecture may be used without departing from the scope of this disclosure. In different embodiments, computing system 900 may take the form of a mainframe computer, server computer, desktop computer, laptop computer, tablet computer, home entertainment computer, network computing device, mobile computing device, mobile communication device, gaming device, etc. As noted above, in some examples the computing system 900 may be integrated into an HMD device.

As shown in FIG. 9, computing system 900 includes a logic subsystem 904, storage subsystem 908, display subsystem 912, and sensor subsystem 916. Computing system 900 may optionally include a communication subsystem 920, an input subsystem 922 and/or other subsystems and components not shown in FIG. 9. Computing system 900 may also include computer readable media, with the computer readable media including computer readable storage media and computer readable communication media. Computing system 900 may also optionally include other user input devices such as keyboards, mice, game controllers, and/or touch screens, for example. Further, in some embodiments the methods and processes described herein may be implemented as a computer application, computer service, computer API, computer library, and/or other computer program product in a computing system that includes one or more computers.

Logic subsystem 904 may include one or more physical devices configured to execute one or more instructions. For example, the logic subsystem 904 may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem 904 may include one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Storage subsystem 908 may include one or more physical, persistent devices configured to hold data and/or instructions executable by the logic subsystem 904 to implement the herein described methods and processes. When such methods and processes are implemented, the state of storage subsystem 908 may be transformed (e.g., to hold different data).

Storage subsystem 908 may include removable media and/or built-in devices. Storage subsystem 908 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Storage subsystem 908 may include devices with one or more of the following characteristics: volatile, nonvolatile, dynamic, static, read/write, read-only, random access, sequential access, location addressable, file addressable, and content addressable.

In some embodiments, aspects of logic subsystem 904 and storage subsystem 908 may be integrated into one or more common devices through which the functionally described herein may be enacted, at least in part. Such hardware-logic components may include field-programmable gate arrays (FPGAs), program- and application-specific integrated circuits (PASIC/ASICs), program- and application-specific standard products (PSSP/ASSPs), system-on-a-chip (SOC) systems, and complex programmable logic devices (CPLDs), for example.

FIG. 9 also shows an aspect of the storage subsystem 908 in the form of removable computer readable storage media 924, which may be used to store data and/or instructions executable to implement the methods and processes described herein. Removable computer-readable storage media 924 may take the form of CDs, DVDs, HD-DVDs, Blu-Ray Discs, EEPROMs, and/or floppy disks, among others.

It is to be appreciated that storage subsystem 908 includes one or more physical, persistent devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal via computer-readable communication media.

Display subsystem 912 may be used to present a visual representation of data held by storage subsystem 908. As the above described methods and processes change the data held by the storage subsystem 908, and thus transform the state of the storage subsystem, the state of the display subsystem 912 may likewise be transformed to visually represent changes in the underlying data. The display subsystem 912 may include one or more display devices utilizing virtually any type of technology. Such display devices may be combined with logic subsystem 904 and/or storage subsystem 908 in a shared enclosure, or such display devices may be peripheral display devices. The display subsystem 912 may include, for example, the display system 66 and transparent display 62 of the HMD device 36.

Sensor subsystem 916 may include one or more sensors configured to sense different physical phenomenon (e.g., visible light, infrared light, sound, acceleration, orientation, position, etc.) as described above. Sensor subsystem 916 may be configured to provide sensor data to logic subsystem 904, for example. As described above, such data may include eye-tracking information, image information, audio information, ambient lighting information, depth information, position information, motion information, user location information, and/or any other suitable sensor data that may be used to perform the methods and processes described above.

When included, communication subsystem 920 may be configured to communicatively couple computing system 900 with one or more networks and/or one or more other computing devices. Communication subsystem 920 may include wired and/or wireless communication devices compatible with one or more different communication protocols. As nonlimiting examples, the communication subsystem 920 may be configured for communication via a wireless telephone network, a wireless local area network, a wired local area network, a wireless wide area network, a wired wide area network, etc. In some embodiments, the communication subsystem may allow computing system 900 to send and/or receive messages to and/or from other devices via a network such as the Internet.

When included, input subsystem 922 may comprise or interface with one or more sensors or user-input devices such as a game controller, gesture input detection device, voice recognizer, inertial measurement unit, keyboard, mouse, or touch screen. In some embodiments, the input subsystem 922 may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

The term "program" may be used to describe an aspect of the mixed reality system 10 that is implemented to perform one or more particular functions. In some cases, such a program may be instantiated via logic subsystem 904 executing instructions held by storage subsystem 908. It is to be understood that different programs may be instantiated from the same application, service, code block, object, library, routine, API, function, etc. Likewise, the same program may be instantiated by different applications, services, code blocks, objects, routines, APIs, functions, etc. The term "program" is meant to encompass individual or groups of executable files, data files, libraries, drivers, scripts, database records, etc.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A mixed reality system for presenting a plurality of visual information density levels for a plurality of geo-located data items in a mixed reality environment, the visual information density levels comprising a minimum visual information density level and a plurality of increasing visual information density levels that each have greater visual information density levels than the minimum visual information density level, the mixed reality system comprising:
   a head-mounted display device operatively connected to a computing device, the head-mounted display device including a display system for presenting the plurality of visual information density levels within the mixed reality environment;
   a memory device; and
   a graduated information delivery program stored in the memory device and executed by a processor of the computing device, the graduated information delivery program configured to:
   receive information for a selected geo-located data item;
   provide the minimum visual information density level for the selected geo-located data item to the display system for display by the head-mounted display device within the mixed reality environment;
   receive via the head-mounted display device a user input corresponding to the selected geo-located data item;
   based on the user input, provide one of the increasing visual information density levels for the selected geo-located data item to the display system for display by the head-mounted display device within the mixed reality environment; and when a spatial information density of geo-located data item information in the mixed reality environment is below a predetermined threshold, provide one of the increasing visual information density levels for the selected geo-located data item, wherein the spatial information density comprises a percentage of a unit area of a display of the head-mounted display device that is occupied by displayed geo-located data item information.

2. The mixed reality system of claim 1, wherein the graduated information delivery program is further configured to:
receive location data of the head-mounted display device; and
based on the head-mounted display device moving closer to a location of the selected geo-located data item, provide one or more of the increasing visual information density levels for the selected geo-located data item to the display system for display by the head-mounted display device.

3. The mixed reality system of claim 1, wherein the increasing visual information density levels occupy increasing amounts of visual space within the mixed reality environment.

4. The mixed reality system of claim 1, wherein the graduated information delivery program is further configured to:
receive information for two or more geo-located data items;
determine that, as displayed via the head-mounted display device, the geo-located data items would be separated by a predetermined distance or less;
based on the separation of the geo-located data items, collapse the geo-located data items into an aggregated geo-located data item; and
provide the minimum visual information density level for the aggregated geo-located data item to the display system for display by the head-mounted display device within the mixed reality environment.

5. The mixed reality system of claim 4, wherein the graduated information delivery program is further configured to:
receive via the head-mounted display device a user input corresponding to the aggregated geo-located data item; and
based on the user input, expand the aggregated geo-located data item to provide an increasing visual information density level for each of the two or more geo-located data items to the display system for display by the head-mounted display device within the mixed reality environment.

6. The mixed reality system of claim 1, wherein the user input is selected from the group consisting of eye tracking data, gesture data, head pose data, voice data, and hand-held indicator data.

7. The mixed reality system of claim 1, wherein the graduated information delivery program is further configured to segregate the information into the plurality of information detail levels.

8. The mixed reality system of claim 1, wherein the geo-located data items are selected from the group consisting of social networking data, image data, recommendation/review data, and entity description data.

9. In a head-mounted display device, a method for presenting a plurality of visual information density levels for a plurality of geo-located data items in a mixed reality environment, the visual information density levels comprising a minimum visual information density level and a plurality of increasing visual information density levels that each have greater visual information density levels than the minimum visual information density level, the method comprising:
receiving information for a selected geo-located data item;
providing the minimum visual information density level for the selected geo-located data item to a display system for display by the head-mounted display device within the mixed reality environment;
receiving a user input corresponding to the selected geo-located data item;
based on the user input, providing one of the increasing visual information density levels for the selected geo-located data item to the display system for display by the head-mounted display device within the mixed reality environment; and
when a spatial information density of geo-located data item information in the mixed reality environment is below a predetermined threshold, provide one of the increasing visual information density levels for the selected geo-located data item, wherein the spatial information density comprises a percentage of a unit area of a display of the head-mounted display device that is occupied by displayed geo-located data item information.

10. The method of claim 9, further comprising:
receiving location data of the head-mounted display device; and
based on the head-mounted display device moving closer to a location of the selected geo-located data item, providing one or more of the increasing visual information density levels for the selected geo-located data item to the display system for display by the head-mounted display device.

11. The method of claim 9, wherein the increasing visual information density levels occupy increasing amounts of visual space within the mixed reality environment.

12. The method of claim 9, further comprising:
receiving information for two or more geo-located data items;
determining that, as displayed via the head-mounted display device, the geo-located data items would be separated by a predetermined distance or less;
based on the separation of the geo-located data items, collapsing the geo-located data items into an aggregated geo-located data item; and
providing the minimum visual information density level for the aggregated geo-located data item to the display system for display by the head-mounted display device within the mixed reality environment.

13. The method of claim 12, further comprising:
receiving via the head-mounted display device a user input corresponding to the aggregated geo-located data item; and
based on the user input, expanding the aggregated geo-located data item to provide an increasing visual information density level for each of the two or more geo-located data items to the display system for display by the head-mounted display device within the mixed reality environment.

14. The method of claim 9, wherein the user input is selected from the group consisting of eye tracking data, gesture data, head pose data, voice data, and hand-held indicator data.

15. The method of claim 9, further comprising segregating the information into the plurality of information detail levels.

16. The method of claim 9, wherein the geo-located data items are selected from the group consisting of social networking data, image data, recommendation/review data, and entity description data.

17. In a head-mounted display device, a method for presenting a plurality of visual information density levels for a plurality of geo-located data items in a mixed reality environment, the visual information density levels comprising a minimum visual information density level and a plurality of increasing visual information density levels that each have greater visual information density levels than the minimum visual information density level, the method comprising:

receiving information for a selected geo-located data item;

segregating the information into the plurality of information detail levels;

providing the minimum visual information density level for the selected geo-located data item to a display system for display by the head-mounted display device within the mixed reality environment;

receiving a user input corresponding to the selected geo-located data item;

based on the user input, providing one of the increasing visual information density levels for the selected geo-located data item to the display system for display by the head-mounted display device within the mixed reality environment;

receiving location data of a user of the head-mounted display device;

based on the user moving closer to a location of the selected geo-located data item, providing another of the increasing visual information density levels for the selected geo-located data item to the display system for display by the head-mounted display device as the user; and when a spatial information density of geo-located data item information in the mixed reality environment is below a predetermined threshold, provide one of the increasing visual information density levels for the selected geo-located data item, wherein the spatial information density comprises a percentage of a unit area of a display of the head-mounted display device that is occupied by displayed geo-located data item information.

18. The method of claim 17, wherein the increasing visual information density levels occupy increasing amounts of visual space within the mixed reality environment.

* * * * *